US012161981B2

(12) United States Patent
Riedlinger

(10) Patent No.: US 12,161,981 B2
(45) Date of Patent: Dec. 10, 2024

(54) MIXING DEVICE

(71) Applicant: RAMPF Production Systems GmbH & Co. KG, Zimmern ob Rottweil (DE)

(72) Inventor: Manfred Riedlinger, Schramberg (DE)

(73) Assignee: RAMPF Production Systems GmbH & Co. KG, Zimmern ob Rottweil (DE)

( * ) Notice: Subject to any disclaimer, the term of this patent is extended or adjusted under 35 U.S.C. 154(b) by 620 days.

(21) Appl. No.: 17/417,536

(22) PCT Filed: Jan. 23, 2020

(86) PCT No.: PCT/EP2020/051587
§ 371 (c)(1),
(2) Date: Jun. 23, 2021

(87) PCT Pub. No.: WO2020/152250
PCT Pub. Date: Jul. 30, 2020

(65) Prior Publication Data
US 2022/0047997 A1 Feb. 17, 2022

(30) Foreign Application Priority Data
Jan. 23, 2019 (DE) .................. 10 2019 200 823.2

(51) Int. Cl.
*B01F 23/23* (2022.01)
*B01F 23/232* (2022.01)
(Continued)

(52) U.S. Cl.
CPC ...... *B01F 23/2323* (2022.01); *B01F 25/3141* (2022.01); *B01F 25/31432* (2022.01);
(Continued)

(58) Field of Classification Search
CPC ............ B01F 23/2323; B01F 23/23352; B01F 23/23365; B01F 25/3141; B01F 25/31432;
(Continued)

(56) References Cited

U.S. PATENT DOCUMENTS

| | | | |
|---|---|---|---|
| 2,263,892 A | 11/1941 | Schaer | |
| 9,440,201 B2 * | 9/2016 | Hepperle | .......... B01F 25/43161 |
| 2017/0216873 A1 | 8/2017 | Sinders et al. | |

FOREIGN PATENT DOCUMENTS

| | | |
|---|---|---|
| CN | 1112457 A | 11/1995 |
| CN | 101370597 A | 2/2009 |

(Continued)

OTHER PUBLICATIONS

Partial English Translation of EP 2975487 A1 (Year: 2016).*
Chinese Application No. 202080010545.4, "Office Action", Sep. 30, 2022, 10 pages.
Chinese Application No. 202080010545.4, Office Action mailed Jul. 26, 2023, 7 pages.
(Continued)

*Primary Examiner* — Charles S Bushey
(74) *Attorney, Agent, or Firm* — Kilpatrick Townsend & Stockton LLP

(57) ABSTRACT

A mixing chamber in which a first liquid comes into contact with a second liquid, and a gas injection device designed to inject a gas into the mixing chamber, wherein the gas injection device includes: a gas source to provide the gas at a predetermined pressure, and a metering unit to limit the gas provided by the gas source to a predetermined flow rate, wherein the metering unit is in contact with the mixing chamber on a gas outlet side of the metering unit, wherein the gas outlet side of the metering unit includes an elongated gap, wherein the gas passes out of the metering unit into the mixing chamber via the elongated gap, and wherein the gas passes out of the metering unit into the mixing chamber.

11 Claims, 1 Drawing Sheet

(51) Int. Cl.
    *B01F 25/314* (2022.01)
    *B01F 25/433* (2022.01)
    *B01F 27/272* (2022.01)
    *B01F 33/40* (2022.01)
    *B01F 23/233* (2022.01)

(52) U.S. Cl.
    CPC ...... *B01F 25/4334* (2022.01); *B01F 27/2722* (2022.01); *B01F 27/2723* (2022.01); *B01F 33/402* (2022.01); *B01F 23/23352* (2022.01); *B01F 23/23365* (2022.01); *B01F 2215/045* (2013.01); *B01F 2215/0468* (2013.01); *B01F 2215/0495* (2013.01)

(58) Field of Classification Search
    CPC .............. B01F 25/4334; B01F 27/2722; B01F 27/2723; B01F 33/402; B01F 2215/045; B01F 2215/0468; B01F 2215/0495
    See application file for complete search history.

(56) References Cited

FOREIGN PATENT DOCUMENTS

| | | |
|---|---|---|
| CN | 102575212 A | 7/2012 |
| CN | 105517766 A | 4/2016 |
| CN | 107848143 A | 3/2018 |
| DE | 4022831 A1 | 1/1992 |
| DE | 10016926 A1 | 10/2001 |
| EP | 2975487 A1 * | 1/2016 |

OTHER PUBLICATIONS

Wuhan, "Mechanical Drawing", Press of University of Science and Technology, China, ISBN 978-7-5S8O ISH-2, Feb. 2016, 7 pages.
German Application No. DE102019200823.2, Search Report, Sep. 11, 2019, 7 pages.
International Application No. PCT/EP2020/051587, International Search Report and Written Opinion, May 8, 2020, 14 pages.

* cited by examiner

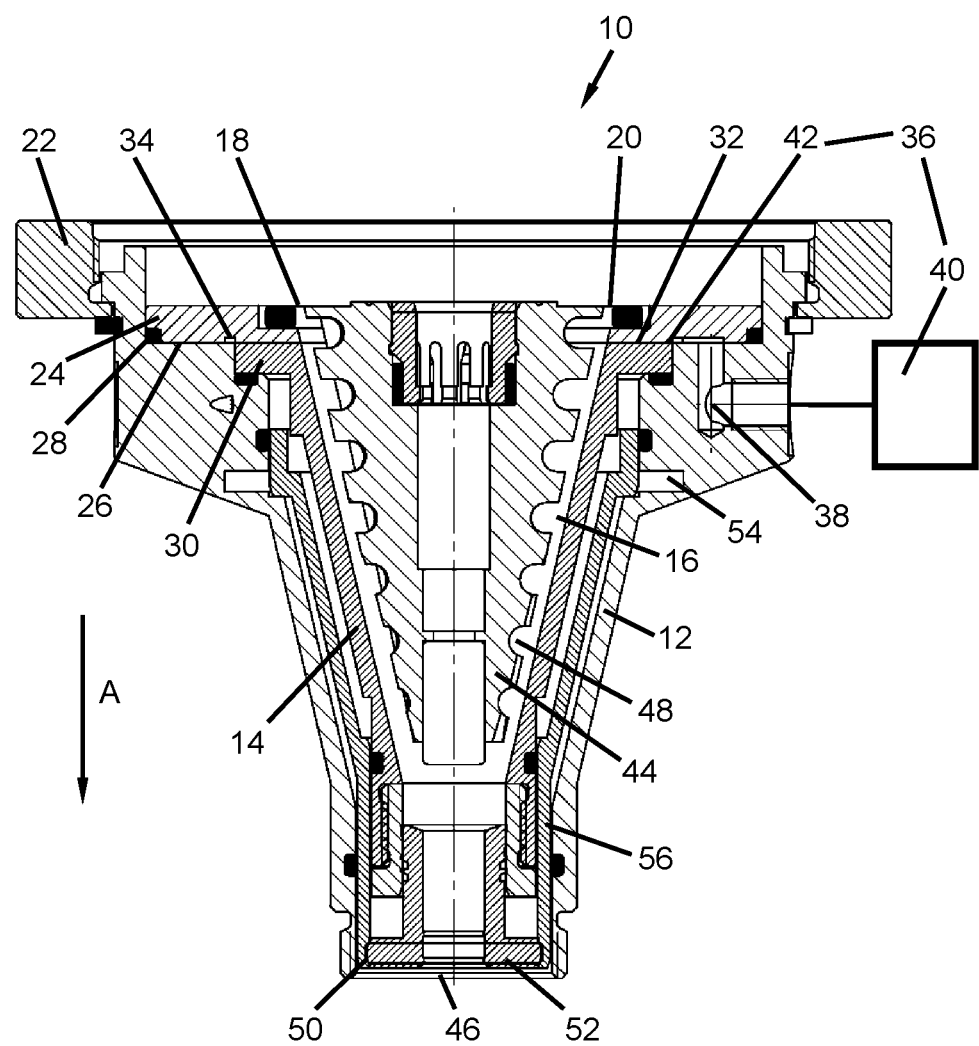

MIXING DEVICE

CROSS REFERENCE TO RELATED APPLICATION

This application is a U.S. national phase of International Patent Application No. PCT/EP2020/051587 filed on Jan. 23, 2020, which claims priority to German Patent Application No. 10 2019 200 823.2, filed in Germany on Jan. 23, 2019. The entire contents of both applications are hereby incorporated herein by this reference.

The present invention relates to a mixing device for mixing a first liquid and a second liquid with a gas.

Mixing devices known to date mix gas, such as air, with a liquid or a mixture of liquids using at least one stirring element, such as dissolver discs. High shear forces arise as a result of the action of the stirring element on the liquid or the mixture of liquids, whereby, inter alia, the thixotropy of the liquid or of the mixture of liquids changes.

In particular, in the case where gas is already supplied to a liquid before it is mixed with another liquid, there is a negative influence on metering accuracy due to the compressibility of the liquid mixed with gas, and therefore a mixing ratio of the two liquids with one another cannot be adjusted accurately or can at least only be adjusted with a great deal of measurement effort for the degree of loading.

The object of the present invention is to provide a mixing device which is able to mix gas with at least one liquid in a simplified manner and without adversely affecting the components to be mixed.

This object is achieved by a mixing device for mixing a first liquid and a second liquid with a gas, comprising a mixing chamber in which the first liquid comes into contact with the second liquid, and a gas injection device which is designed to inject gas into the mixing chamber, wherein the gas injection device has:
- a gas source which provides gas at a predetermined pressure,
- a metering unit which is designed to limit the gas provided by the gas source to a predetermined flow rate, and which is in contact with the mixing chamber on the gas outlet side,
- wherein the gas outlet side of the metering unit has an elongated gap via which the gas passes out of the metering unit into the mixing chamber.

It should already be noted at this point that the term 'liquid' is to be understood as meaning both liquid and pasty material, i.e. in general any material which is suitable for being mixed with a gas.

Due to the fact that no gas-dispersing stirring element is used in the mixing device according to the invention, high shear forces can be avoided. Furthermore, this makes it possible for a temperature of the particular liquid or of the liquid-gas mixture to be substantially homogeneous.

Because, in the mixing device according to the invention, gas is supplied to the mixing chamber, the liquids to be mixed can remain incompressible until they are introduced into the mixing chamber. A mixing ratio of the two liquids in the mixing chamber can thus be adjusted highly accurately. It is also possible to use highly thixotropic materials. This positive effect is retained even if the gas is supplied to only one of the liquids before it comes into contact with the other liquid, still within the mixing chamber.

In contrast to metering nozzles, the metering unit according to the invention having an elongated gap allows gas to be introduced into the liquid mixture in a fine and planar manner.

The quantity of gas is controlled in the mixing device according to the invention via the differential pressure between a pressure prevailing in the mixing chamber and a pressure prevailing in the gas source. In this way, the quantity of gas introduced into the mixing chamber can depend directly on the mixing chamber pressure.

The metering unit can advantageously be formed from two planar elements coupled to one another. In this case, the elongated gap can result from the roughness of two surfaces lying on top of one another, in the sense of a membrane function.

The planar elements can abut one another substantially over their entire surface. By dimensioning the planar elements, in particular in a depth direction of the elongated gap, i.e. along a gas flow direction between the planar elements, parameters such as the size of the gas bubbles and/or the pressure of the gas being introduced into the mixing chamber can be set.

Furthermore, the abutting surfaces of the planar elements can have a mean surface roughness of at most Ra 0.1, in particular of at most Ra 0.05, advantageously of Ra 0.03. It is obvious that a low mean surface roughness results in a small passage of air and a high mean surface roughness results in a large passage of air. It should be noted at this point that the roughness Ra is given here in μm.

In a development of the present invention, the planar elements can be designed as ring discs, wherein the gas outlet side of the metering unit can be formed on the inside of the ring. By designing the elongated gap as a ring, a release area of the metering unit, via which gas is introduced into the liquid mixture, can be enlarged. If the gas outlet side of the metering unit is arranged on the inside of the ring, a liquid mixture can, for example, be guided completely through the ring and thus be uniformly permeated by gas over the cross section of the liquid mixture flow.

The planar elements can be made of metal, in particular hard metal, such as hardened steel, and/or aluminium, such as hard anodized aluminium, and/or of ceramic and/or of polytetrafluoroethylene. In particular, materials whose surface roughness can be adjusted after their production, for example by grinding, can be suitable for producing the planar elements.

Furthermore, the planar elements can be made of a porous material. Porous material is to be understood here in particular as an open-pore porous material through the pores of which gas can pass. In this case, the planar elements can also be designed as an integral component. Of course, a closed-pore material is also conceivable.

In an advantageous development, the metering unit can have a flow rate of at most 100 cm$^3$/s at a pressure of approximately 20 bar, in particular a flow rate of at most 20 cm$^3$/s at a pressure of approximately 4 bar. It has been shown that, given such values, particularly good mixing of the liquid mixture with gas can be achieved.

Of course, it is also entirely conceivable in the case of the mixing device according to the invention that the mixing device can further comprise a stirring means which mixes the first liquid, the second liquid and the added gas with one another. As already mentioned at the beginning, however, it is possible according to the present invention to dispense with a stirring means which is responsible for dispersing, in particular breaking up the gas bubbles in the liquid mixture.

The stirring means can be designed to be operated at a rotational speed of at most 10,000 rpm, in particular at most 6,000 rpm.

In a possible embodiment of the mixing device according to the invention, the gas can be air.

In an application in which the advantages of the present invention are particularly evident, the first liquid can have a viscosity of 100 mPa·s to 500,000 mPa·s, in particular from 500 mPa·s to 100,000 mPa·s.

Alternatively or additionally, the second liquid can have a viscosity of 20 mPa·s to 200,000 mPa·s, in particular from 150 mPa·s to 100,000 mPa·s.

In particular, the first liquid can be polyol or silicone A and/or the second liquid can be isocyanate or silicone B. In particular, the present invention can make it possible not to change or at least to only slightly change the thixotropy of the polyol, such that the negative effects of changing the thixotropy which occur in mixing devices of the prior art can be avoided when handling polyol.

In general, the thixotropy is divided into the ranges 'low thixotropic', 'medium thixotropic' and 'highly thixotropic'.

The predetermined pressure of the gas provided by the gas source can advantageously be 1 bar to 30 bar, in particular 15 bar to 25 bar, advantageously 24 bar.

Hereinafter, the present invention will be described in more detail with reference to the accompanying drawings, in which:

FIG. 1 is a cross-sectional view of a mixing device according to the invention.

In FIG. 1, a mixing device according to the invention is generally denoted with reference sign 10. The mixing device 10 comprises a housing 12 in which an element 14 extending in a main flow direction A of the liquids flowing through the mixing device 10 is arranged. The element 14 forms an outer wall of a mixing chamber 16. A first liquid is introduced into the mixing chamber 16 at a first entry point 18 into the mixing chamber 16. A second liquid is introduced into the mixing chamber 16 at a second entry point 20.

The respective sources or reservoirs of the first and the second liquid are arranged in a superordinate assembly (not shown), which is arranged upstream in relation to the main flow direction A and to which the mixing device 10 can be connected via a fastening device 22 such as a fastening nut 22.

A first planar element 24 is arranged adjacent to the entry points 18 and 20 of the two liquids, the lower side 26 of which element is sealed off with respect to a radially outer side by a seal 28 cooperating with the first planar element 24 and the housing 12. In this case, the first planar element 24 is designed substantially as a ring disc.

A radially inner portion of the first planar element 24 abuts a second planar element 30 which is formed by an annular portion of the element 14 delimiting the mixing chamber 16.

A gap 32 is formed between the first planar element 24 and the second planar element 30, through which gap gas can enter the mixing chamber 16 in a defined manner. To provide gas on the radially outer side of the gap 32, an annular groove 34 surrounding the gap is provided, which annular groove is formed in the first planar element 24. On the side shown on the right in FIG. 1, the annular groove 34 is in fluid communication with bores 38 which connect the annular groove 34 to an outer side surrounding the housing 12, such that a gas source 40 can provide gas to the annular groove 34 at a predetermined pressure.

In this way, the gap 32 formed by the first planar element 24 and the second planar element 30 forms a metering unit 42 which can introduce gas, such as air, provided by the gas source 40, into the mixture of liquids around the entire outer circumference of a flow of liquid mixture consisting of the first or second liquid which has been introduced into the mixing chamber 16 at entry points 18 and 20. The metering unit 42 and the gas source 40 can together be considered to be a gas injection device 36.

By correspondingly producing or processing a surface roughness of the surfaces of the first planar element 24 and the second planar element 30 that are in contact with one another, an amount of gas passing through the gap 32 and/or a size of the gas bubbles entering from the gap 32 into the liquid mixture which is located in the mixing chamber 16 can be adjusted very precisely.

A stirring means 44 is arranged centrally in the mixing chamber 16, which stirring means is designed to mix the first liquid, the second liquid and the gas with one another. As can be seen in FIG. 1, the metering unit 42 or the gap 32 is arranged directly adjacent to the entry points 18 and 20 of the first and second liquid. In this way, a conveying path from a portion of the mixing device 10 at which the first liquid, the second liquid and the gas are initially mixed with one another to a dispensing end 46 of the mixing device 10 can be maximised, whereby the outcome of mixing the components mentioned above can be improved.

The stirring means 44 has grooves 48 on its outer circumference, which can improve gripping of the gas-liquid mixture and thus mixing of the components.

The mixing device 10 further comprises a closure unit 50 which comprises a closure element 52 which can interact with the stirring means 44 in such a way that a release of gas-liquid mixture from the dispensing end 46 of the mixing device 10 can be prevented. To close the closure unit 50, a fluid at a predetermined pressure can be introduced into a space 54 which is provided in the housing 12 of the mixing device 10, causing a lifting device 56 of the closure unit 50 to move in an upward direction in FIG. 1 in order to bring the closure element 52 closer to the stirring means 44, i.e. to close the dispensing end 46.

The invention claimed is:

1. A mixing device for mixing liquids with gas, comprising:
    a mixing chamber in which a first liquid comes into contact with a second liquid, and
    a gas injection device designed to inject a gas into the mixing chamber,
    wherein the gas injection device comprises:
        a gas source to provide the gas at a predetermined pressure, and
        a metering unit to limit the gas provided by the gas source to a predetermined flow rate, wherein the metering unit is formed from a first planar element coupled to a second planar element, wherein a surface of the first planar element abuts substantially an entire surface of the second planar element,
        wherein the metering unit is in contact with the mixing chamber on a gas outlet side of the metering unit,
        wherein the gas outlet side of the metering unit comprises an elongated gap resulting from a roughness of the surface of the first planar element and a roughness of the abutting surface of the second planar element, and
        wherein the gas passes out of the metering unit into the mixing chamber via the elongated gap.

2. The mixing device of claim 1, wherein the surface of the first planar element and the surface of the second planar element have a mean surface roughness (Ra) of at most Ra 0.1 μm.

3. The mixing device claim 1, wherein the planar elements comprise ring discs and wherein the gas outlet side of the metering unit is formed on an inside of the ring discs.

4. The mixing device of claim 1, wherein the planar elements are made of one or more of metal, of ceramic, or of polytetrafluoroethylene.

5. The mixing device of claim 1, wherein the planar elements are made of a porous material.

6. The mixing device of claim 1, wherein the mixing device further comprises a stirring means to mix the first liquid, the second liquid, and the added gas with one another.

7. The mixing device of claim 6, wherein the stirring means is operable at a rotational speed of, at most, 10,000 rounds per minute (rpm).

8. The mixing device of claim 4, wherein the metal comprises steel or aluminium.

9. A mixing device for mixing liquids with gases, comprising:
   a mixing chamber in which a first liquid comes into contact with a second liquid, and
   a gas injection device designed to inject a gas into the mixing chamber,
   wherein the gas injection device comprises:
      a gas source to provide the gas at a predetermined pressure, and
      a metering unit to limit the gas provided by the gas source to a predetermined flow rate, wherein the metering unit is formed from a first planar element coupled to a second planar element, wherein a surface of the first planar element abuts substantially an entire surface of the second planar element,
         wherein the metering unit is in contact with the mixing chamber on a gas outlet side of the metering unit,
         wherein the gas outlet side of the metering unit comprises an elongated gap resulting from a roughness of the surface of the first planar element and a roughness of the abutting surface of the second planar element, and
         wherein the gas passes out of the metering unit into the mixing chamber via the elongated gap.

10. The mixing device of claim 9, wherein the gas outlet side of the metering unit comprises an elongated gap, and wherein the gas passes out of the metering unit into the mixing chamber via the elongated gap.

11. A mixing device for mixing liquids with gases, comprising:
   a mixing chamber in which a first liquid comes into contact with a second liquid, and
   a gas injection device designed to inject a gas into the mixing chamber,
   wherein the gas injection device comprises:
      a gas source to provide the gas at a predetermined pressure, and
      a metering unit to limit the gas provided by the gas source to a predetermined flow rate, wherein the metering unit is formed from a first ring disc coupled to a second ring disc, wherein a surface of the first ring disc abuts substantially an entire surface of the second ring disc,
         wherein the metering unit is in contact with the mixing chamber on a gas outlet side of the metering unit,
         wherein the gas outlet side of the metering unit is formed on an inside of the ring discs,
         wherein the gas outlet side of the metering unit comprises an elongated gap resulting from a roughness of the surface of the first ring disc and a roughness of the abutting surface of the second ring disc, and
         wherein the gas passes out of the metering unit into the mixing chamber via the elongated gap.

* * * * *